United States Patent [19]

Manson

[11] Patent Number: 4,506,375
[45] Date of Patent: Mar. 19, 1985

[54] X-RAY CALIBRATION SYSTEM

[76] Inventor: James E. Manson, P.O. Box 1288, Concord, Mass. 01742

[21] Appl. No.: 461,642

[22] Filed: Sep. 27, 1983

[51] Int. Cl.³ .............................................. G01T 1/16
[52] U.S. Cl. ................................ 378/207; 250/252.1; 378/138
[58] Field of Search ................... 378/207, 19, 56, 138, 378/140, 147; 250/252.1, 394

[56] References Cited

U.S. PATENT DOCUMENTS

| | | | |
|---|---|---|---|
| 2,399,650 | 5/1946 | Moyer | 378/207 |
| 2,503,062 | 4/1950 | Moriarty | 378/56 |
| 2,812,462 | 11/1957 | Maltby et al. | 378/140 |
| 3,107,311 | 10/1963 | Gray | 378/138 |

Primary Examiner—Alfred E. Smith
Assistant Examiner—T. N. Grigsby
Attorney, Agent, or Firm—Wolf, Greenfield & Sacks

[57] ABSTRACT

A method and apparatus for the radiometric calibration of an X-ray detector, such as a spectrometer, for wavelengths in the range of 2 to 200 angstroms. A hot filament X-ray diode for generating a point source of X-rays is disposed within a vacuum manifold and is surrounded by a housing having two ports equally spaced from the point source. A center line of each port passing through the point source forms substantially the same angle with respect to the line defined by the stream of electrons passing from the cathode to the anode of the X-ray diode so that the apparent intensity of the point source through each port is substantially identical. A reference detector is placed opposite one port to intercept a known portion of an X-ray beam emitted therefrom, while the detector to be calibrated is placed opposite the other port for interception of a known portion of an X-ray beam passing through that port. The X-ray diode includes an anode which is provided with a replaceable cap for control of the wavelength of radiation emitted. The output generated in the reference detector is used for calibration of the detector to be calibrated.

19 Claims, 4 Drawing Figures

X-RAY CALIBRATION SYSTEM

FIELD OF THE INVENTION

This invention relates generally to X-ray spectroscopy and more particularly to radiometric calibration of X-ray detectors and instruments for wavelengths in the range of 2 to 200 angstroms.

BACKGROUND OF THE INVENTION

Prior to use, any radiation detector used for intensity measurements, such as a spectrometer, must be calibrated. Radiometric calibration presents special problems for X-ray analysis, particularly for soft and ultrasoft X-rays having wavelengths in the range of 2 to 200 angstroms, because of the problems inherent in focussing the radiation and because of the nature of the apparatus used for generating the radiation. The radiometric calibration of such instruments is, as a result, time-consuming and expensive, even to achieve an accuracy of ten or twenty percent. Because of the sensitive nature of instrumentation in this region, the entire result can be rendered useless quickly by a simple vacuum accident or over a period of weeks by contamination. In particular, the X-ray range of the spectrum between 10 angstroms and 120 angstroms, or about 100 EV to 1,000 EV is beyond the truly useful range of the available standard sources, such as synchrontron or electron storage ring and standard detectors, such as the NBS diodes. In addition, there is a problem of compatibility of such instruments with a host calibration facility. Finally, because the calibration facility is normally remote from the instrument to be calibrated, it is impossible to spot-check calibrations when desired.

Existing methods of calibration include sending the detector to be calibrated to the National Bureau of Standards, but the National Bureau of Standards will only calibrate instruments meeting their high structural standards, and the difficulties involved in shipping and transporting such an instrument are obvious. Other known methods of calibration include using a reference detector, such as an absolute detector. In this method, a single beam source is used, and the absolute detector is placed between the detector to be calibrated and the source. Once appropriate readings have been taken, the absolute detector is removed physically and the other detector may be calibrated. This procedure is cumbersome, and does not always produce accurate results because of the time delay between the two measurements taken. In addition, the necessity of physically moving the absolute detector increases the likelihood of error. A somewhat similar system is described by Morgan (Morgan, F. J., A. H. Gabriel and M. J. Barton, 1 J. Phys. (E) 998 (1968)) in which the absolute detector is placed between the detector to be calibrated and the source, but is offset at a slight angle of about 5-10 degrees below the detector to be calibrated. The radiation flux received by the absolute detector is thus not exactly equal to that received by the detector to be calibrated, and thus a certain amount of error is inherent. The accuracy of the reading is proportional to the distance of the two detectors from the source. Obviously, a large, cumbersome and expensive apparatus is required for a high degree of accuracy, and because of the necessarily long path for the radiation, a high power X-ray source is required.

In addition to the system developed by Morgan, most X-ray calibration devices utilize a high power X-ray source. Examples are the well known Henke source or variations thereof as shown by Morgan at page 999 or an electron synchrotron as used by Tomboulian. (Tomboulian, D. H., and P. C. Hartman, 102 Phys. Rev. 1423 (1956)). All of these high power sources require water cooling to prevent melting of the anode and other parts of the apparatus. Also, because the source areas of most of these known high power sources are large and poorly defined, two apertures are required to produce a well defined X-ray beam, one close to the source to limit the beam, and another aperture spaced from the source to limit the angle of the beam. It is nearly impossible to generate two beams of the same intensity at different angles with such a source.

Each of the above described methods of calibration is time-consuming and requires expensive and complex apparatus, and thus few laboratories can be equipped to provide the accuracy of radiometric calibration required for most experiments and analyses.

SUMMARY OF THE INVENTION

It is an object of this invention to provide a relatively uncomplicated and inexpensive apparatus for rapid, precision radiometric calibration of an X-ray detector for wavelengths in the range of 2 to 200 angstroms.

It is a further object of this invention to provide a reliable, quick and relatively straightforward method for precision radiometric calibration of an X-ray detector for wavelengths in the range of 2 to 200 angstroms.

In accordance with the above objects, apparatus is provided for accurately and quickly calibrating an X-ray detector prior to use. This apparatus includes a vacuum manifold, a hot filament, X-ray diode for providing a nearly point source of X-rays within a vacuum and a housing surrounding the point source. The housing is provided with two ports which are equally spaced from the point source. Center lines of each port passing through the point source are disposed at substantially the same angle with respect to the line defined by a stream of electrons passing from the cathode to the anode of the X-ray diode so that the apparent intensity of the source at each port is determined to be identical. The angle formed between the center lines of the two ports is typically in the range of 60 degrees to 120 degrees. Disposed in a position to intercept a known portion of the beam emitted from one port is an absolute detector, such as a proportional counter, while disposed in position to intercept a known portion of the beam emitted from the other port is the detector to be calibrated, such as a spectrometer. The output of the absolute detector is used to calibrate the source for calibration of the detector to be calibrated in a manner known to those skilled in the art.

The anode includes a threadably mounted cap screw which may be replaced with a cap of the desired material for generation of the desired wavelength radiation. The anode is supported independently of the housing and the cathode for rapid replacement of the cap without disturbing the precision alignment of the apparatus. Because the combination of the apparatus allows matching of the angular aperture of the usual soft X-ray detector to be calibrated with the point source, only a low-power X-ray source is required, and the cooling supply normally associated with high power sources is not necessary. A single heat conducting rod extending into the surrounding air is sufficient. All the above elements are attached to the vacuum manifold by appropriate flanges for easy servicing, for mounting of the desired X-ray detector to be calibrated, and for replacement of the anode cap.

The method of this invention includes generating a nearly point source of X-rays in an X-ray diode and providing two beams of radiation through two ports in a housing surrounding the point source, so that the apparent intensity of the source is substantially identical for each port. An absolute detector is placed behind an aperture of known size and distance opposite one of the ports to intercept a known portion of the beam passing through that port, while the detector to be calibrated having a known entrance aperture is placed opposite the other port for interception of a known portion of the beam passing therethrough. The absolute detector and the detector to be calibrated each are positioned to view the entire source at the same angle with respect to the electron stream in the X-ray diode. The output of the absolute detector is used to calibrate the point source and the response of the detector to be calibrated is measured for calibration thereof in a known manner. The accuracy of the calibration may be readily verified by interchanging the position of the reference detector and the detector to be calibrated.

BRIEF DESCRIPTION OF THE DRAWING

The objects, advantages and features of this invention will be more clearly appreciated from the following detailed description when taken in conjunction with the accompanying drawing in which.

DETAILED DESCRIPTION OF THE PREFERRED EMBODIMENTS

Figure 1:
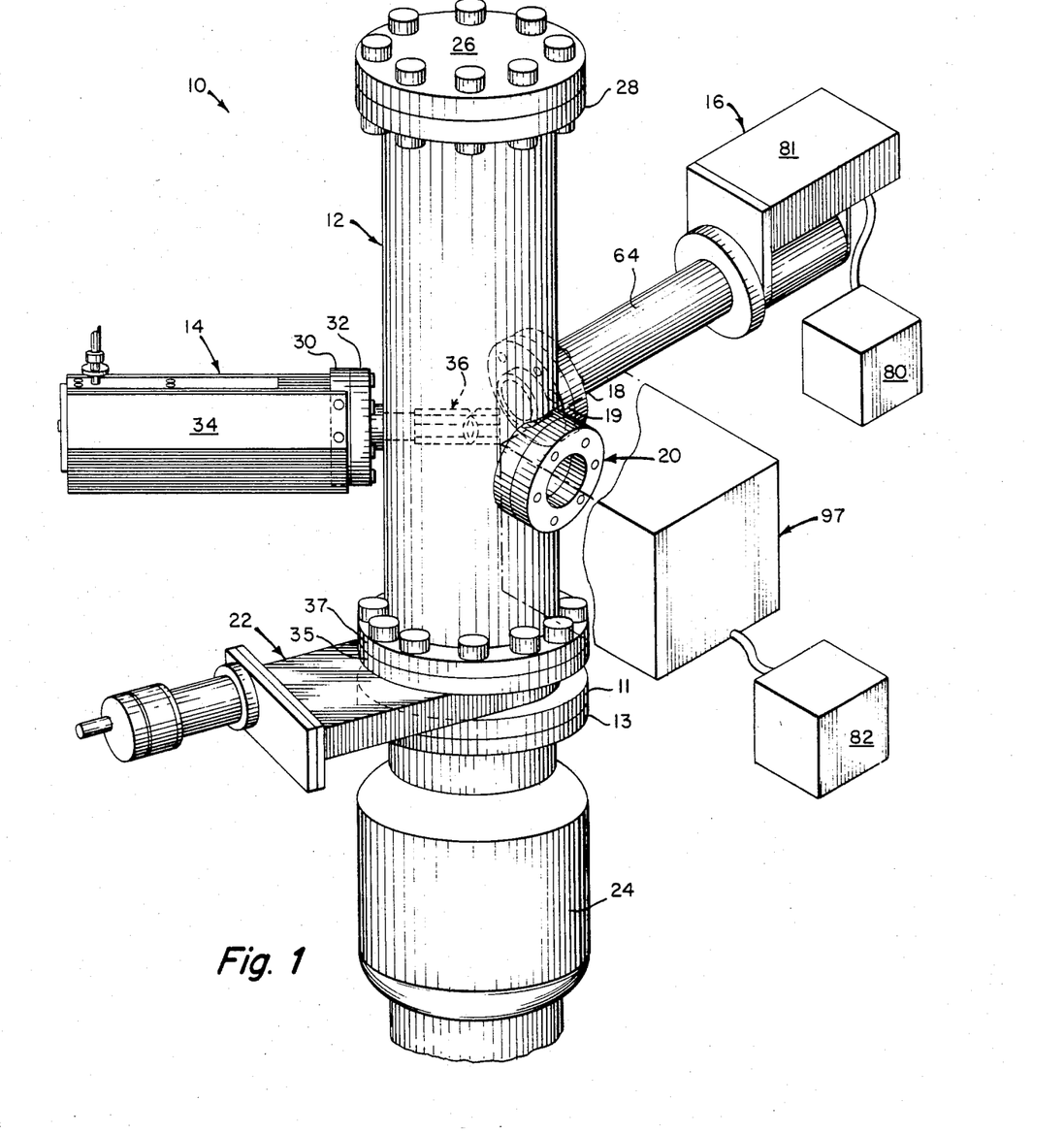
FIG. 1 is a perspective view of the exterior of the apparatus of this invention.

With reference now to the drawing, and more particularly to FIG. 1 thereof, the X-ray radiometric calibration device 10 of this invention will be described. Device 10 includes a vacuum manifold 12, an X-ray source 14 coupled to manifold 12, a reference detector 16 coupled to manifold 12, a flange 20 for coupling of a detector to be calibrated 97 to manifold 12, a vacuum trap and pump 24 and a gate-valve 22 connecting trap 24 to manifold 12 at its lower end. Manifold 12 is sealed at the top end by cap 26 which is secured by flange 28. Pump 24 maintains a vacuum in the entire system for accuracy of measurement.

Each element of the apparatus is sealingly and removeably coupled to manifold 12 by respective flanges to permit easy disassembly of the apparatus and to permit replacement or repair of various elements as necessary. Thus, source 14 is provided with a flange 30 which is secured to flange 32 on manifold 12. Similarly, reference detector 16 is provided with flange 18 which is secured to flange 19, and gate-valve 22 is provided with flange 35 which is secured to flange 37 on manifold 12, and flanges 11 and 13 secure trap 24 to gate valve 22. This coupling of flanges can be provided in any known manner, but is typically accomplished using standard nuts and bolts in combination with known seals, such as soft copper crush gaskets or viton ring seals, for maintenance of the vacuum.

Figure 2:
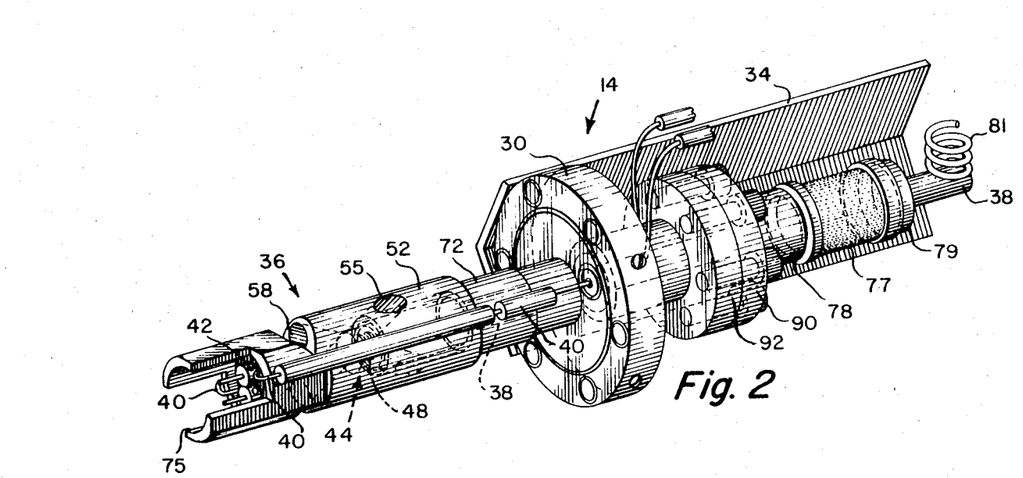
FIG. 2 is a partially cut-away perspective view of the X-ray source of FIG. 1.
Figure 3:
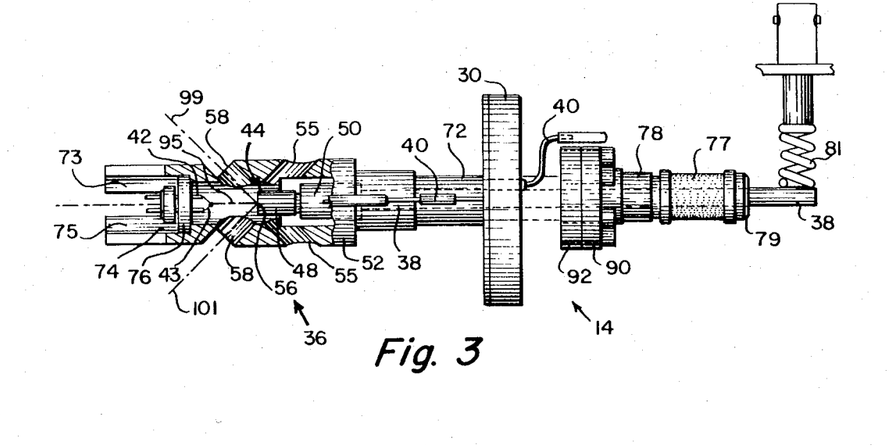
FIG. 3 is a side view of the apparatus of FIG. 2.

Source 14 will now be described with particular reference to FIGS. 2 and 3. Source 14 produces X-rays having wavelengths primarily in the range of 2 to 200 angstroms, and such radiation is known as soft and ultrasoft X-rays. Source 14 includes a high voltage shield 34 removably coupled to flange 30 on a side facing away from manifold 12. When device 10 is assembled, hot filament X-ray diode 36 extends from one side of flange 30, through an opening in flange 32 and into the interior of manifold 12. Diode 36 includes cathode 42 and anode 44. Anode 44 is typically in the shape of a right cylinder, and cathode 42 typically includes a hairpin filament 43 whose tip preferably lies on or near the axis of anode 44. Filament 43 is typically made of tungsten and has a diameter of about 0.008 inches. Cathode 42 is coupled by leads 40 to a known source of power (not shown), typically a two- or three-volt filament transformer with variable supply to the primary, which is capable of delivering a low voltage, low-power current to filament 43. The power delivered is generally about 10 watts. The anode is maintained at a high positive potential with respect to the cathode, typically 5,000–10,000 volts, and is coupled to a voltage source (not shown) such as a nuclear detector high voltage supply. Anode 44 comprises a cap 48 of a desired material which is removably supported on a stud 50. Anode 44 and cathode 42 are surrounded by a grounded housing 52 and are electrically isolated therefrom.

The detail of the mounting of cathode 42, anode 44 and housing 52 will now be described with reference to FIGS. 2 and 3. Housing 52 is mounted onto the inside of flange 30 by hollow sleeve 72. Sleeve 72 is typically welded to flange 30 while housing 52 is typically secured to sleeve 72 by screws to permit removal thereof. Cathode 42 is mounted onto a nonconducting disc 74 and disc 74 is preferably friction fit into the opening 73 in the end of housing 52 and against shoulder 76. Leads 40 extend from filament 43, out through notch 75, alongside housing 52 and sleeve 72 and through flange 30 where thay are connected to the source of power.

Support rod 38, which is composed of a good heat-conducting material such as copper, supports anode 44 independently of housing 52 and cathode 42. Rod 38 extends from the interior of housing 52, through sleeve 72 and flange 30 and beyond in spaced, noncontacting relation with each of these elements. Disposed on the one end of rod 38 within housing 52 is stud 50, typically composed of stainless steel. Cap 48 is removably secured to stud 50, typically by screw threads, to permit replacement thereof. At the other end of rod 38, one end of a nonconductive hollow sleeve 77 made of a material such as ceramic is secured thereto by hollow sleeve 79, typically by brazing. Sleeve 77 in turn is connected to hollow sleeve 78 which is mounted onto flange 90. Flange 90 is adopted to be removably mounted onto flange 92 when the apparatus is assembled as shown, and flange 92 is secured to flange 30. Thus, rod 38 is supported only at its end within shield 34 and extends unsupported its entire length through flanges 30 and 32 and into housing 52 and electrically isolated therefrom. A conductive spring 81 coupled to the anode power source bears against the end of rod 38 to provide the desired positive potential to anode 44. Although a certain inherent camber is provided to rod 38, rod 38 is sufficiently rigid to maintain anode 44 in the desired spaced alignment with housing 52 and cathode 42. Anode 44 may be quickly removed independently of housing 52 and cathode 42 by uncoupling flange 90 from flange 92.

The combination of the high positive potential of anode 44 with respect to cathode 42 and the grounding of housing 52 produces a simple electrostatic lens for focussing the cathode electrons onto anode 44. Since the tip of filament 43 of cathode 42 typically lies along the axis of anode 44, the electrostatic lens images the stream 95 of electrons emitted by the cathode 42 onto the center of the anode producing a source spot 56 of X-rays. Source spot 56 is typically about one millimeter in diameter, although the size could be somewhat greater or lesser.

Source spot 56 should at least match the aperture of the entrance of the instrument with which it is to be used, since X-rays cannot be conveniently focussed as are other wavelength radiations, and the radiation source cannot be imaged easily onto the entrance of the instrument to be used. The match between the source and the entrance aperture need not be perfect, but the degree of mismatch should be a known consideration in the design of an experiment. The smaller the size of the point of the source of X-rays, down to about one millimeter in diameter, the easier it is to match to the entrance aperture of the instrument. Because the source is matched to the entrance slit, as will be described, and because the electrons are focussed in the manner described above, a low cathode beam power, typically in the order of 0.5 to 5 watts may be utilized, obviating water-cooling of the apparatus. Cooling is provided only by support rod 38 which conducts heat away from the interior of manifold 12 and into the surrounding ambient air.

Housing 52 has two ports 58. Each port 58 has generally the same diameter and is positioned on housing 52 at about the same distance from source spot 56. Center lines 99 and 101 extending from source spot 56 and passing through the center of each port 58 each subtend generally the same angle with respect to stream 95 of electrons passing from cathode 42 to anode 44. With this configuration, the apparent intensity of source spot 56 at the center of each port 58 is identical. In a preferred embodiment, stream 95 is coincident with the axis of anode 44. Typically, ports 58 are disposed on diametrically opposite sides of housing 52, although they need not be. Preferably lines 99 and 101 are disposed at an angle of 45 degrees with respect to electron stream 95, although any angle in the range of 30 degrees to 60 degrees would be suitable. The exact angle used depends on the physical limitations imposed by detectors 16 and 97. Typically, lines 99 and 101 include an angle in the range of 60 degrees to 120 degrees.

A detector to be calibrated 97 is aligned with one port 58 and secured by flange 20 to intercept a known portion of the beam emitted by that port. Reference detector 16 is aligned with the other port 58 to intercept a known portion of the beam emitted therefrom for measurement of source spot 56. Detectors 16 and 97 each should view source spot 56 at the same angle with respect to stream 95. The output of reference detector 16 is typically connected through an amplifier 81 to a pulse height analyzer (PHA) 80, while the output of the detector to be calibrated 97 is connected to a multichannel scaler 82. Since the apparent intensity of source spot 56 at the center of both ports 58 is identical, the output produced by reference detector 16 can be used to calibrate source 14 for calibration of detector 97 in a known manner. Since detector 97 may be readily mounted onto device 10 by connection to flange 20, spot-checks may be made of detector 97 without necessitating excessive downtime. In the alternative, if detector 97 is a massive one, such as a spectrometer, manifold 12 and detector 16 are sufficiently small that they may be transported to detector 97 and mounted thereon for spot checks.

In a preferred embodiment, both ports 58 are provided with a diameter larger than required for ideal beam geometry to accommodate movement of source spot 56 or an inability to center spot 56 on anode 44. Preferably, ports 58 have a 0.25 inch diameter and the distance of the furthest edge of each port 58 from the center of anode 44 is about 0.61 inches. This feature allows reference detector 16 and detector 97 to be adjusted within an angular range so that each views spot 56 at the same angle with respect to stream 95. For an angle of 45 degrees between stream 95 and lines 99 and 101, the permitted range of angle with respect to stream 95 through which spot 56 may be viewed by detectors 16 and 97 is 33.4 degrees to 56.6 degrees. For an angle of 60 degrees between lines 99 and 101 and stream 95, the corresponding permitted range of angle is 47 degrees to 73 degrees. For this reason, a tolerance of plus or minus two degrees is permitted in the accuracy of the angular orientation of lines 99 and 101 of ports 58. The primary requirement is that detectors 16 and 97 each have an equivalent view of spot 56. Stated another way, detector 16 and 97 must each intercept a known portion of a beam of X-rays emitted from an associated port 58 at the same angle with respect to stream 95. This can be assured by testing of the apparatus with a laser beam or other visible light prior to use. If ports 58 are made much larger, the electrostatic fields within housing 52 will become too distorted for proper focussing of stream 95.

Sighting apertures 55 are provided in alignment with associated ports 58 on the opposite sides of housing 52. Apertures 55 permit visual alignment of detectors 16 and 97 with spot 56 and with associated ports 58.

Reference detector 16 may be changed or replaced simply by removing the screws connecting flange 16 to 18. Similarly, anode 44 may be withdrawn for replacement of or changing of cap 48 merely by removing the bolts securing flange 90 to flange 92. Housing 52 remains fixed in position while anode 44 is withdrawn to expose cap 48 for replacement. When anode 44 is then replaced by reattachment of flanges 90 and 92, the desired precise alignment of housing 52 with respect to cathode 42, detector 16 and detector 97 is quickly reestablished without any additional alignment procedures, because of the precise positioning and alignment of flanges 30 and 32, and flanges 90 and 92. Thus, an exchange of caps 48 may be accomplished with a minimum of effort and downtime.

Cap 48 may be replaced with a cap coated with or formed of any desired material, depending upon the wavelength or frequency of the radiation desired. Examples of material which may be used on cap 48 include magnesium oxide or milk of magnesia, boron powder on a magnesium anode, beryllium powder using a magnesium oxide binder on a magnesium anode, or pure graphite. The wavelength of the resulting X-rays depend upon the precise material used and upon the positive potential of the anode.

An example of reference detector 16 is a subatmospheric pressure, thin window, gas flow proportional counter. One example of such a proportional counter is a Manson model 04 photon counter available from J. E.

Figure 4:
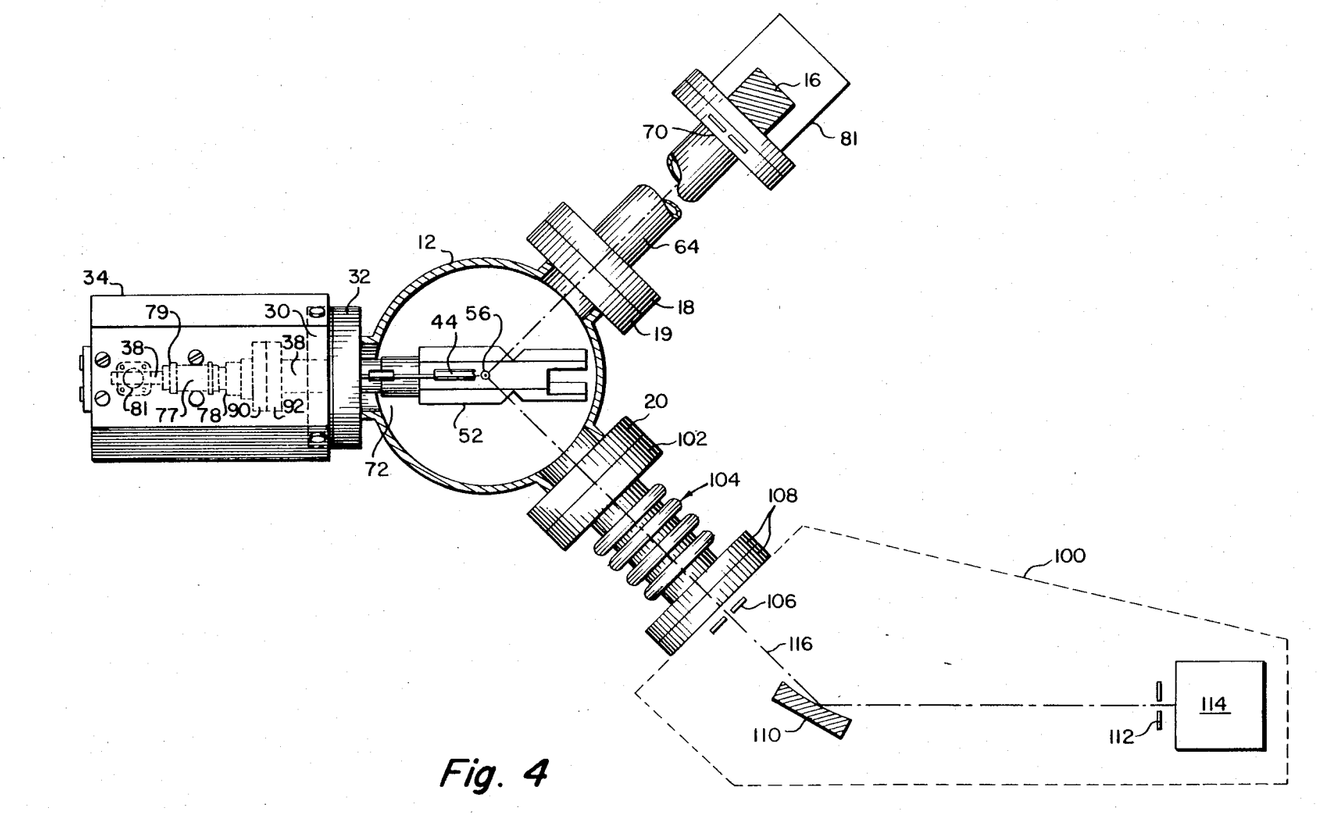
FIG. 4 is a diagrammatic top view of the apparatus of FIG. 1 illustrating its use in conjunction with a spectrometer.

Manson Company, Concord, Mass. 01742. Amplifier 81 may be a Manson PAL-01 Preamp Amplifier, also available from J. E. Manson Company. Detector 16 is disposed on the end of tube 64 which is connected to manifold 12 by flanges 18 and 19. Tube 64 serves to space detector 16 a desired distance from point source 56 so that the intensity of the radiation is reduced sufficiently to allow accurate measurement by detector 16 which is typically highly sensitive. This reduction of intensity must be accomplished in a manner which allows exact calculation thereof for production of an accurate measurement of the source intensity. One technique is to use a neutral filter such as a metal mesh, and another technique is to use a single small pinhole aperture 70. The use of a pinhole aperture 70 is illustrated in FIG. 4 and is preferred. Aperture 70 must be of a size so that its area can be readily calculated, but it cannot be too large or it will not serve the desired purpose. A suggested aperture size is 0.015 inches in diameter. The reduction in intensity or irradiance is readily determined in a known manner by mounting aperture 70 at a precisely known distance from point source 56 and by knowing the precise diameter of aperture 70. Aperture 70 must be matched to source 56 so that at least the entire breadth of source 56 is included therein, as previously indicated. This feature will be discussed further with respect to spectrometer 100 in FIG. 4.

FIG. 4 illustrates a typical application of device 10 for calibrating a spectrometer 100. Like numbers are used for like parts of FIGS. 1-3 where possible. Spectrometer 100 is connected to a flexible coupling 104 by flanges 108 to permit alignment of spectrometer 100, as will be described, and coupling 104 is connected to flange 102 which is secured to flange 20. Spectrometer 100 is shown schematically, and includes an entrance slit 106 adjacent flanges 108, a grazing incidence grating 110, an exit slit 112 and a known scanner 114. As previously indicated, at least the entire breadth of point source 56 must be matched to the entrance slit 106. In order to match source 56 to slit 106, the rays from opposite sides of source 56 must pass through slit 106 and must intersect grating 110. For this to happen, optic axis 116 of spectrometer 100 which passes through slit 106 and through the center of grating 110 has to be at a predetermined angular position and distance with respect to source spot 56. For this reason, flexible flange 104 is provided to allow adjustment of the angular position of optic axis as well as the linear distance of slit 106 from source 56. For example, if source 56 has a diameter of about 0.03 inches and spectrometer 100 has an angular field of view of one-half degree, slit 106 must be at a distance of at least 3 inches for the entire source spot 56 to be included within the angular field of spectrometer 100. If the field of view of spectrometer 100 is less than one-half degree, which often happens, or the source spot is larger than the 0.03 inches, the position of slit 106 must be adjusted accordingly. Thus, coupling 104 is typically about 4 inches long to allow for movement of slit 106 into the optimum alignment, and the total distance from source 56 to slit 106 is typically approximately 7 inches. The X-rays from spot 56 are focused by grating 110 only in the plane of the drawing onto exit slit 112, after which they pass into detector scanner 114 where the readings are taken. The lateral extent of the useful part of grating 110 together with its position relative to slit 106 determine the angular width of the entrance aperture of spectrometer 100. Grating 110 has a shallow spherical surface to provide the desired focusing, and slits 106 and 112 extend perpendicular to the plane of the drawing.

In a typical application, detector 97, such as a spectrometer 100, is far less sensitive than detector 16. The angular spacing of ports 58 allows detector 97 to be placed as close to manifold 12 as required while allowing detector 16 to be spaced at a greater distance. In this manner the results achieved are far more accurate than in existing devices.

The method and operation of the apparatus of this invention will now be described with reference to FIGS. 1-4. Prior to use, a reference detector 16 is affixed to flange 19 and a detector to be calibrated 97 is affixed to flange 20. Detectors 16 and 97 are each optically aligned using visible light and with apertures 55 so that each will view spot 56 at the same angle with respect to stream 95. The interior of housing 52 between cathode 42 and anode 44, and the interiors of manifold 12, detector 16 and the detector to be calibrated 97 are then placed in a vacuum. Filament 43 of cathode 42 is heated by coupling it to a source of electrical energy rated at approximately 10 watts. Anode 44 is maintained at a high positive potential with respect to cathode 42, typically in the range of 5,000 to 10,000 volts. Cap 48 of anode 44 is provided with a desired chemical composition, and the composition of cap 48 and the positive potential of anode 44 determine the wavelength and frequency of the radiation produced. Housing 52 is maintained at a ground potential. Typically, the apex of filament 43 is aligned with the central axis of the right cylindrical anode 44. A point source spot 56 of X-rays is produced on anode 44 by the intersection of a stream 95 of electrons emitted from the filament 43 with cap 48 on anode 44. This electron stream 95 typically has 0.5 to 5 watts of power. This source spot 56 is preferably located at the center of anode 44. X-rays produced at source spot 56 exit housing 52 through ports 58. The apparent intensity of source 56 is identical at each port 58. Reference detector 16, such as a proportional counter, is aligned with one port 58, and the detector to be calibrated 97, such as spectrometer 100, which is aligned with the other port 58, each view source 56 at the same angle with respect to stream 95. The entrance angular aperture of spectrometer 100 and aperture 70 are each matched to source 56 so that at least the entire extent of source 56 is included within their field of view. The output of the reference detector is determined from PHA 80 and is used to calibrate source 14, and once source 14 is calibrated, detector 97 can be calibrated in a known manner. Heat from diode 36 is dissipated only through support rod 38 and sleeve 72. The accuracy of the calibration may be verified by reversing the positions of the reference detector 16 and detector 97 and by observing that the results are the same.

In view of the above description it is likely that modifications and improvements will occur to those skilled in the art which are within the scope of this invention, as defined by the following claims and their equivalents.

What is claimed is:

1. A system for the radiometric calibration of an X-ray detector comprising:
   means for providing a substantially point source of X-ray radiation;
   a first port for providing a first beam of radiation emanating from said point source;
   a second port for providing a second beam of radiation emanating from said point source, the second beam being disposed at an angle with respect to the first beam, the apparent intensity of said point source at the center of said second port being substantially identical to the apparent intensity of said point source at the center of said first port;

a reference detector for intercepting and measuring a known portion of the first beam of radiation;

means for positioning a detector to be calibrated to intercept and measure a known portion of the second beam of radiation; and means for analyzing the output of said reference detector to determine the intensity of said point source for calibration of the detector to be calibrated.

2. A system as recited in claim 1 wherein said first port and said second port are disposed in a substantially cylindrical housing surrounding said providing means and having a central axis.

3. A system as recited in claim 2 wherein the angle formed between the known portion of the first beam and said central axis of said housing substantially equals the angle formed between the known portion of the second beam and said central axis of said housing.

4. A system as recited in claim 1 further comprising:
a central vacuum manifold
means for sealingly coupling said reference detector to said vacuum manifold at a predetermined position and distance with respect to said point source;
means for removably supporting said point source providing means within said manifold; and
means for providing a vacuum within said manifold, said reference detector, the detector to be calibrated and said point source providing means.

5. A system as recited in claim 1 wherein said reference detector is a thin window, gas flow proportional counter.

6. A system as recited in claim 1 wherein said detector to be calibrated is a spectrometer.

7. A system as recited in claim 1 wherein an entrance aperture of said detector to be calibrated includes at least the entire extent of said point source within its field of view.

8. A system as recited in claim 7 wherein said positioning means for the detector to be calibrated includes a flexible coupling for adjustment of the position of the entrance aperture of the detector to be calibrated with respect to said point source.

9. A system as recited in claim 1 wherein said means for providing a point source of radiation comprises:
a cathode filament;
a low-power source for heating said cathode filament to provide an electron source;
an anode maintained at a high positive potential with respect to said cathode filament; and
housing means surrounding said cathode and said anode and having a neutral charge;
said cathode filament, said anode and said housing means together forming an electrostatic lens for focussing an electron stream onto a surface of said anode to generate said point source.

10. A system as recited in claim 9 wherein said first port and said second port are formed in said housing means and are disposed at the same distance from said point source, and wherein a line passing from said point source through the center of said first port forms an angle with respect to said electron stream substantially equal to the angle formed between a line passing from said point source through the center of said second port and said electron stream.

11. A system as recited in claim 9 further comprising:
first means for removably supporting said housing means and said cathode filament in a desired position with respect to said anode; and
second means removable independently of said first supporting means for supporting said anode in a desired position with respect to said housing means and said cathode filament.

12. A system as recited in claim 11 wherein said anode comprises a cap formed of a preselected material and secured to said second supporting means normally facing said cathode filament, said cap being removable for replacement thereof upon removal of said second supporting means.

13. A system as recited in claim 11 wherein said second supporting means is at least partially comprised of a heat conducting material and extends into the ambient atmosphere for cooling of said providing means.

14. A system as recited in claim 3 wherein the angle formed between the known portion of said first beam and the known portion of said second beam is between 60 degrees and 120 degrees.

15. A system as recited in claim 10 wherein the angle formed between the line passing through the center of said first port and the electron stream is between 30 degrees and 60 degrees.

16. A system for radiometric calibration of a first X-ray detector for X-rays having wavelengths in the range of 2 to 200 angstroms comprising:
a vacuum manifold;
means for providing a vacuum within said manifold;
a cathode filament disposed within said manifold;
a low-power source for heating said cathode filament to provide a source of electrons;
an anode having a removable cap formed of a preselected material, said cap being disposed in closely spaced relation with said cathode filament within said manifold, said anode being maintained at a high positive potential with respect to said cathode filament;
a housing surrounding said cathode filament and said anode, said housing having a ground potential, said cathode filament, said anode and said housing forming an electrostatic lens for focussing a stream of electrons emitted by said cathode filament onto the surface of said anode cap for producing a point source of X-rays;
means for supporting said anode independently of said housing for permitting said anode to be removed from said manifold independently of said cathode filament and said housing for replacement of said anode cap;
a first port formed in a side of said housing for allowing a first beam of X-rays to pass therethrough;
a second port formed in another side of said housing for allowing a second beam of X-rays, to pass therethrough, a line passing from said point source through the center of said first port forming an angle with respect to said electron stream generally equal to the angle formed between said electron stream and a line passing from said point source through the center of said second port, the apparent intensity of said point source being the same at the center of both said first port and said second port;
a reference detector mounted to said manifold for interception and measurement of a known portion of the first beam;

means for mounting a detector to be calibrated to said manifold for interception and measurement of known portion of the second beam; and means associated with said reference detector for determination of the intensity of the point source for calibration of the detector to be calibrated.

17. A method for the radiometric calibration of an X-ray detector comprising the steps of:

generating a focussed stream of electrons for striking an anode to produce a point source of X-rays;

providing two beams of X-rays emanating from the point source through two angularly spaced ports, said beams including an angle in the range of 60 degrees to 120 degrees, the apparent intensity of the point source for each beam at the center of its associated port being equal;

positioning a reference detector to intercept a known portion of one of the two beams at a first angle with respect to the electron stream;

positioning a detector to be calibrated to intercept a known portion of the other of the two beams at a second angle with respect to the electron stream, the first angle being equal to the second angle;

calculating the intensity of the source of X-rays using the output of the reference detector; and calibrating the detector to be calibrated from the known intensity of the source.

18. A method as recited in claim 17 further comprising the step of including the entire lateral extent of the point source within the field of view of the entrance slit of the detector to be calibrated.

19. A method as recited in claim 17 further comprising the step of cooling the source of X-rays at least partially by a heat conducting rod extending from the source of X-rays into the ambient atmosphere.

* * * * *

UNITED STATES PATENT AND TRADEMARK OFFICE
CERTIFICATE OF CORRECTION

PATENT NO. : 4,506,375

DATED : March 19, 1985

INVENTOR(S) : James E. Manson

It is certified that error appears in the above-identified patent and that said Letters Patent is hereby corrected as shown below:

On the Title Page, Item [22] Filed: "Sep. 27, 1983" should read

-- Jan. 27, 1983 --.

Signed and Sealed this

Eighteenth Day of August, 1987

Attest:

DONALD J. QUIGG

*Attesting Officer*   *Commissioner of Patents and Trademarks*